(12) United States Patent
Hsieh

(10) Patent No.: US 7,089,810 B2
(45) Date of Patent: Aug. 15, 2006

(54) TORQUE APPLYING TOOL WITH DISPLAY WINDOW

(76) Inventor: Chih-Ching Hsieh, No. 367, Pei-Yang Rd., Feng Yuan, Taichung (TW)

( * ) Notice: Subject to any disclaimer, the term of this patent is extended or adjusted under 35 U.S.C. 154(b) by 0 days.

(21) Appl. No.: 10/974,880

(22) Filed: Oct. 28, 2004

(65) Prior Publication Data

US 2006/0090575 A1    May 4, 2006

(51) Int. Cl.
*G01L 1/04* (2006.01)
(52) U.S. Cl. ................................. 73/862.623
(58) Field of Classification Search ........... 73/862.623, 73/862.23, 862.21, 338, 862.26, 761, 862.338; 81/479, 164, 57.36; 7/139; 33/758
See application file for complete search history.

(56) References Cited

U.S. PATENT DOCUMENTS

| | | | | |
|---|---|---|---|---|
| 4,006,629 A * | 2/1977 | Barrett et al. ................. 73/139 |
| 4,257,263 A * | 3/1981 | Herrgen .................... 73/862.23 |
| 4,641,538 A * | 2/1987 | Heyraud ................... 73/862.26 |
| 4,958,541 A * | 9/1990 | Annis et al. .................. 81/479 |
| 4,967,435 A * | 11/1990 | Seals ............................. 7/139 |
| 4,982,612 A * | 1/1991 | Rittmann ................. 73/862.23 |
| 5,345,636 A * | 9/1994 | Lamons ......................... 7/139 |
| 5,501,107 A * | 3/1996 | Snyder et al. ........... 73/862.23 |
| 5,767,416 A * | 6/1998 | Conard ........................ 73/856 |
| 6,119,562 A * | 9/2000 | Jenkins ........................ 81/479 |
| 6,463,811 B1 * | 10/2002 | Putney .................... 73/862.21 |

* cited by examiner

*Primary Examiner*—Max Noori
*Assistant Examiner*—Octavia Davis

(57) ABSTRACT

A torque applying tool includes a handle and a function end which includes two jaws. A first resistive strain gauge and a second resistive strain gauge are respectively connected to two respective insides of the two jaws. A third resistive strain gauge is connected to the handle and electronically connected to the first and second resistive strain gauges. A display unit is connected to the handle and electronically connected to the third resistive strain gauge. The display unit displays the value of torque that is a result of calculation of information from the resistive strain gauges.

2 Claims, 5 Drawing Sheets

TORQUE APPLYING TOOL WITH DISPLAY WINDOW

FIELD OF THE INVENTION

The present invention relates to an electronic torque applying tool that chooses one of the two resistive strain gauges that has larger value according to the direction that the tool rotates.

BACKGROUND OF THE INVENTION

A conventional electronic wrench is disclosed in U.S. Pat. No. 3,970,155, and includes a handle and a function end such as a box end or two open-ended jaws, two resistive strain gauges are embedded in the tool and located between the function end and the handle. The two resistive strain gauges are electronically connected to a display window which shows the value of the torque that the wrench applies to objects. However, the value of the torque that is displayed in the display window is not precise enough to meet the practical needs. Another conventional electronic wrench is disclosed in U.S. Pat. No. 4,982,612, and includes a handle and a function end such as a box end or two open-ended jaws. A first resistive strain gauge is disposed in the neck, two second resistive strain gauges are disposed in one of two sides of the neck, and a third resistive strain gauge is disposed in the other side of the neck. The four resistive strain gauges are electronically connected to a Wheastone bridge which is connected to a processor and a display window. By the four resistive strain gauges, the result is more precise. Nevertheless, it is noted that even if the wrench applies the same torque to an object, to rotate the wrench in clockwise and counter clockwise can have two different values form the reading of the display window. This is because one of the two jaws of the wrench bears different force during rotation of the wrench.

The present invention intends to provide an electronic torque applying tool which includes two resistive strain gauges respectively contacting the object to be rotated and the processor of the tool can be set to read either one of the two gauges in pre-set ways to provide the users more precise results.

SUMMARY OF THE INVENTION

The present invention relates to a torque applying tool that comprises a handle and a function end connected to one of two ends of the handle. A first resistive strain gauge and a second resistive strain gauge are respectively connected to the function end so as to be in contact with an object to be loosened or tightened. A third resistive strain gauge is connected to the handle and electronically connected to the first and second resistive strain gauges. A display unit is connected to the handle and electronically connected to the third resistive strain gauge.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
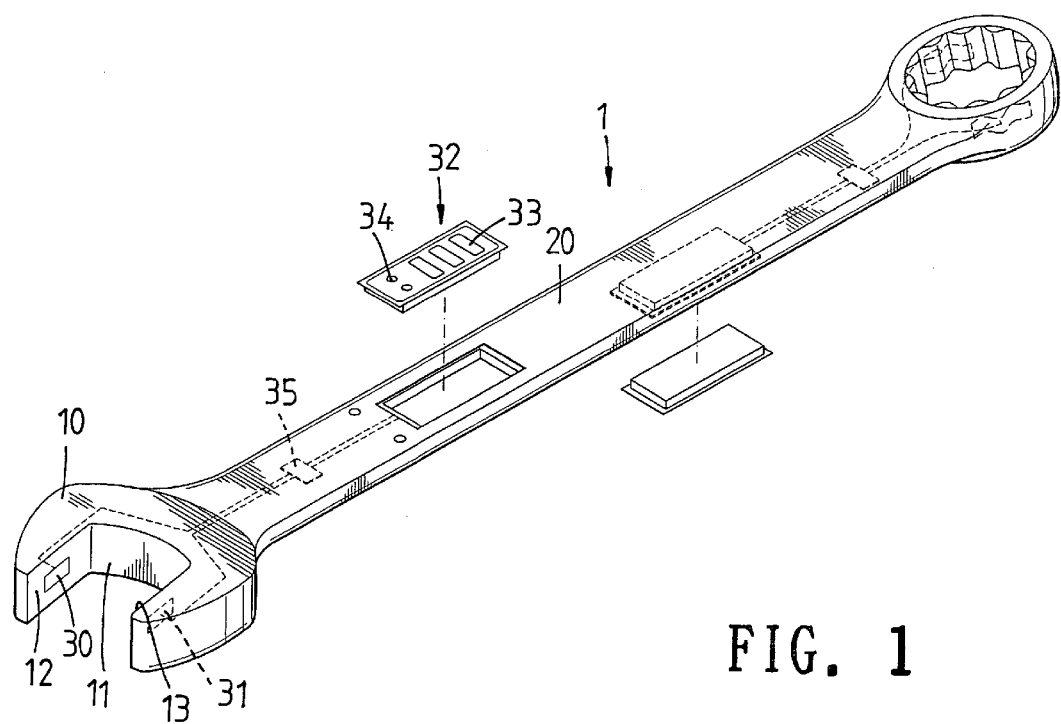
FIG. 1 is an exploded view to show the display units and the resistive strain gauges in the wrench of the present invention.
Figure 2:
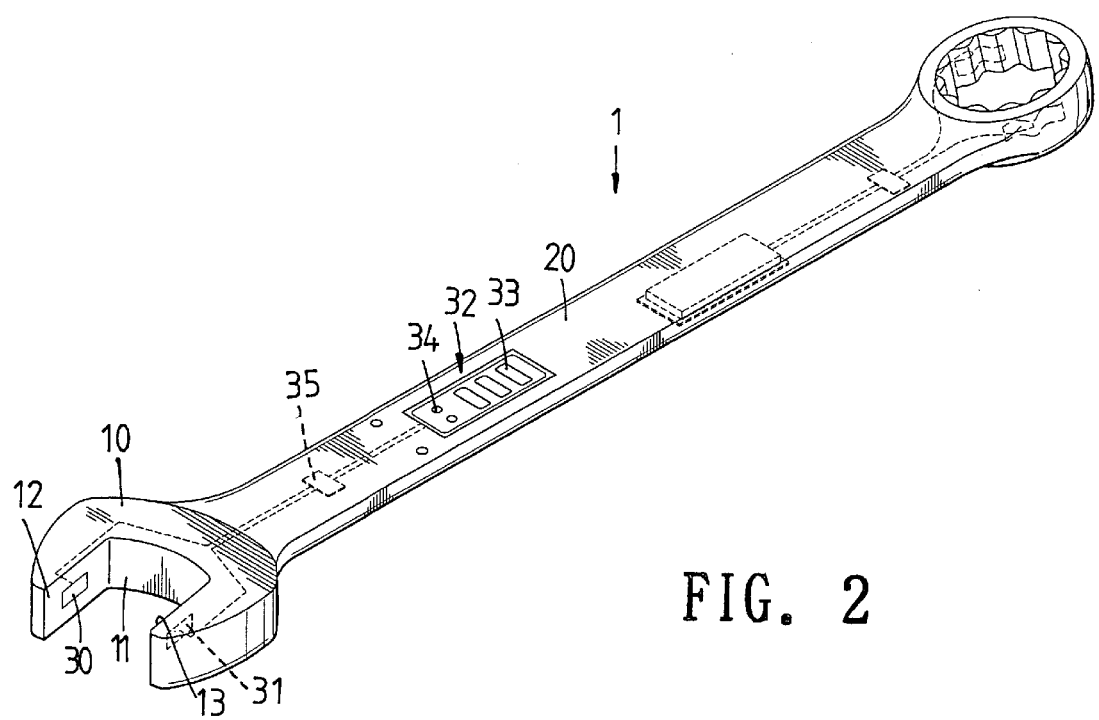
FIG. 2 is a perspective view of the wrench of the present invention.
Figure 3:
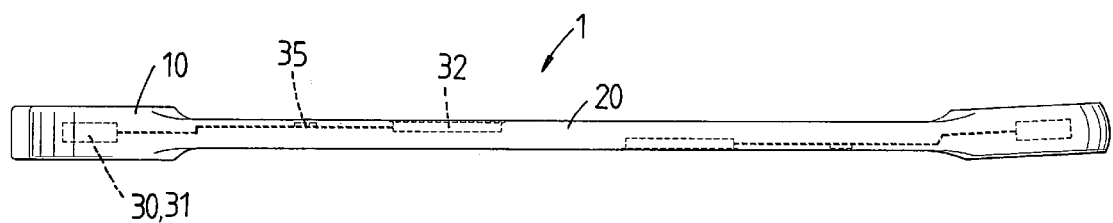
FIG. 3 is a side top view of the wrench of the present invention.

Referring to FIGS. 1 to 3, a first embodiment of the torque applying tool 1 of the present invention is a wrench which comprises a handle 20 and two function ends are connected to two ends of the handle 20. One of the function ends is an open end which includes two jaws between which an accommodation space 11 is defined. The other function end is a box end. A first resistive strain gauge 30 and a second resistive strain gauge 31 are respectively connected to the two respective insides 12 and 13 of the two jaws. A third resistive strain gauge 35 is connected to the handle 20 and electronically connected to the first and second resistive strain gauges 30, 31. Similarly, the other set of the first, second and third resistive strain gauges are connected to the box end and the handle. Two display units 32 are connected to two opposite sides of the handle 20 and electronically connected to the two respective third resistive strain gauges 35. Each display unit 32 includes a display screen 33 and two adjusting buttons 34.

When applying a torque to an object accommodated between the two jaws or in the box end, the first and second resistive strain gauges 30, 31 are slightly deformed and the corresponding resistance of the two gauges 30, 31 are changed. In the meanwhile, the third resistive strain gauge 35 is also deformed and has a resistance difference. These resistance differences are collected and calculated by a processor (not shown) in the display unit 32, a value of the torque is then displayed in the display screen 33.

In order to have more precise result, the adjusting buttons 34 can be respectively pressed to set a pre-set way of calculation. When an object is clamped by the two jaws and the wrench is rotated clockwise, the first resistive strain gauge 30 is deformed more than that in the second resistive strain gauge 31. The setting picks ⅔ of the value calculated from the first resistive strain gauge 30 and ⅓ of the value calculated from the second resistive strain gauge 31. On the contrary, when the wrench is rotated counter clockwise, the first resistive strain gauge 30 is deformed less than that in the second resistive strain gauge 31. The setting picks ⅓ of the value calculated from the first resistive strain gauge 30 and ⅔ of the value calculated from the second resistive strain gauge 31. The setting can also be defined to pick only the larger value form either the first resistive strain gauge 30 or the second resistive strain gauge 31.

Figure 5:
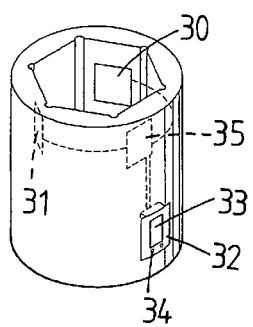
FIG. 5 shows a socket with resistive strain gauges and display unit.
Figure 4:
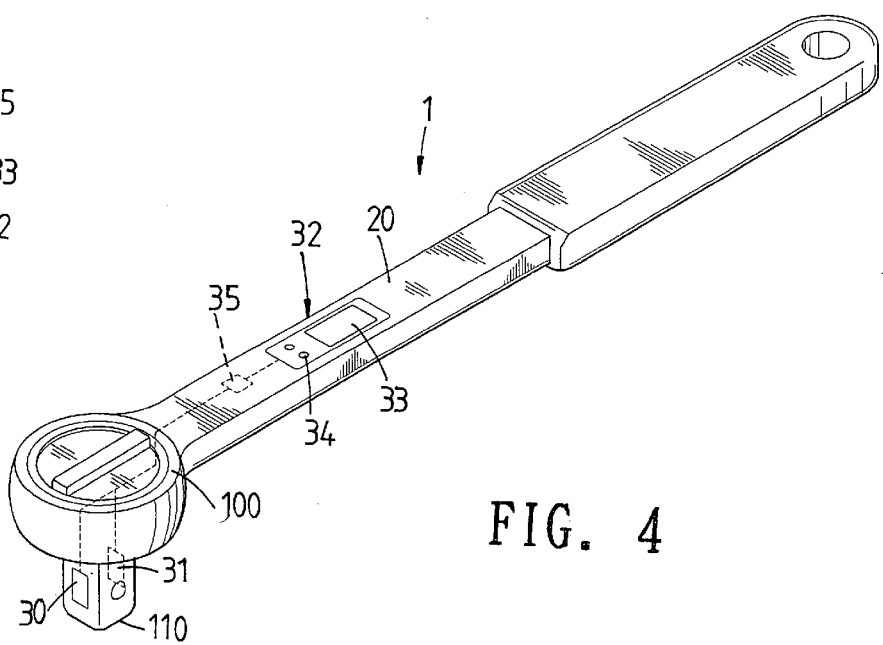
FIG. 4 is a perspective view of the ratchet wrench of the present invention.

FIG. 4 shows another embodiment wherein the function end 100 includes a driving shaft 110, the first resistive strain gauge 30 and the second resistive strain gauge 31 are respectively connected to the two opposite sides of the driving shaft 11. FIG. 5 shows yet another embodiment wherein the first resistive strain gauge 30 and the second resistive strain gauge 31 are respectively connected to two of six insides of a socket, and the third resistive strain gauge 35 is embedded in the socket and the display unit 32 is displaced on an outside of the socket.

Figure 6:
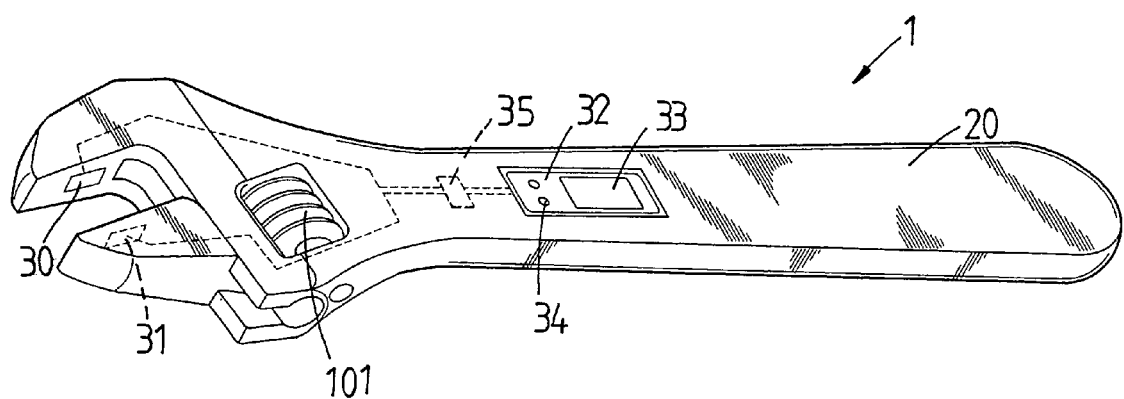
FIG. 6 shows an adjustable wrench of the present invention.

FIG. 6 shows that the two jaws can be a fixed jaw and a movable jaw which is controlled by a thumb screw 101. A first resistive strain gauge 30 and a second resistive strain gauge 31 are respectively connected to the two respective insides and 13 of the fixed jaw and the movable jaw. A third resistive strain gauge 35 is connected to the handle 20 and electronically connected to the first and second resistive strain gauges 30, 31. A display unit 32 is connected to one of two opposite sides of the handle 20 and electronically connected to the third resistive strain gauge While we have shown and described the embodiment in accordance with the present invention, it should be clear to those skilled in the art that further embodiments may be made without departing from the scope of the present invention.

What is claimed is:

1. A torque applying tool comprising:

a handle and two function ends connected to two ends of the handle, one of the function ends including two jaws between which an accommodation space is defined, a first resistive strain gauge and a second resistive strain gauge respectively connected to the two respective insides of the two jaws, a third resistive strain gauge connected to the handle and electronically connected to the first and second resistive strain gauges, a display unit connected to the handle and electronically connected to the third resistive strain gauge, and the other function end being a box end and a fourth resistive strain gauge and a fifth resistive strain gauge connected to the box end, a sixth resistive strain gauge connected to the handle and electronically connected to the fourth and fifth resistive strain gauges, two display units connected to two opposite sides of the handle and electronically connected to the third and sixth resistive strain gauges.

2. The tool as claimed in claim 1, wherein each of the display units includes a display screen and two adjusting buttons.

* * * * *